T. HECKER.
SHOCK LOADER.
APPLICATION FILED JAN. 28, 1910.

1,016,826.

Patented Feb. 6, 1912.
3 SHEETS—SHEET 1.

T. HECKER.
SHOCK LOADER.
APPLICATION FILED JAN. 28, 1910.

1,016,826.

Patented Feb. 6, 1912.

3 SHEETS—SHEET 3.

Witnesses

Inventor
Thomas Hecker
By
Attorneys

UNITED STATES PATENT OFFICE.

THOMAS HECKER, OF CARRINGTON, NORTH DAKOTA.

SHOCK-LOADER.

1,016,826.  Specification of Letters Patent.  Patented Feb. 6, 1912.

Application filed January 28, 1910. Serial No. 540,624.

*To all whom it may concern:*

Be it known that I, THOMAS HECKER, a citizen of the United States, residing at Carrington, in the county of Foster, State of North Dakota, have invented certain new and useful Improvements in Shock-Loaders; and I do hereby declare the following to be a full, clear, and exact description of the invention, such as will enable others skilled in the art to which it appertains to make and use the same.

This invention relates to harvesting machinery and has special reference to a shock loader, the device being arranged to pick up standing shocks and deposit them on a vehicle.

One object of the invention is to provide a novel means arranged to positively engage shocks of grain as they are left standing in the field, pick them up and deposit them on the vehicle while the machine is being driven across the field, the operation being performed while the loader is in motion.

With the above and other objects in view, as will be hereinafter apparent, the invention consists in general of a shock loader provided with improved means to pick up successive shocks of grain, said means comprising a novel form of rotary disks supporting fingers, together with improved means for moving said fingers into operative and inoperative positions at predetermined points in the revolutions of said disks.

The invention further consists in certain novel details of construction and combinations of parts hereinafter fully described, illustrated in the accompanying drawings, and specifically set forth in the claims.

Figure 1:
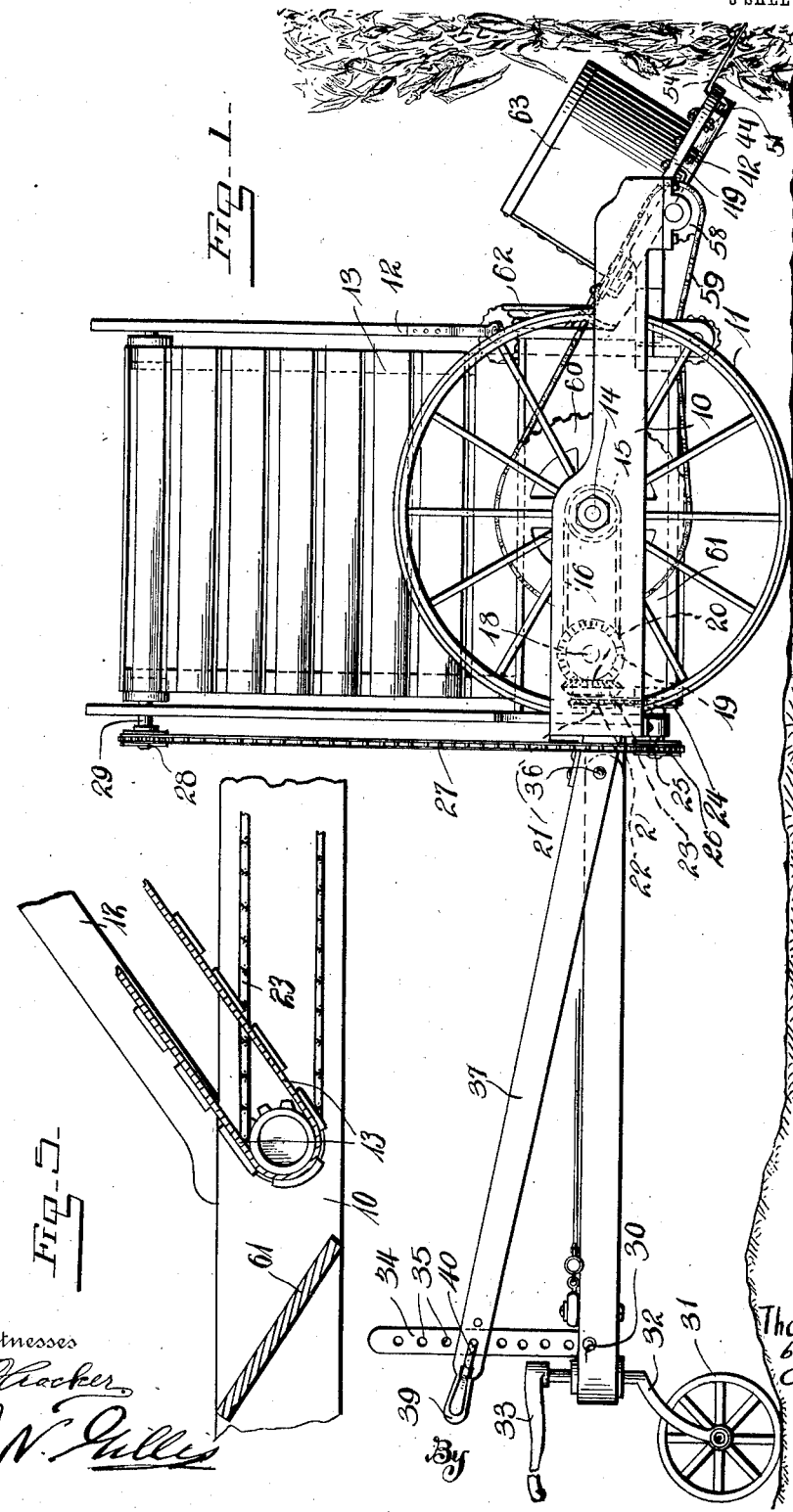
Figure 2:
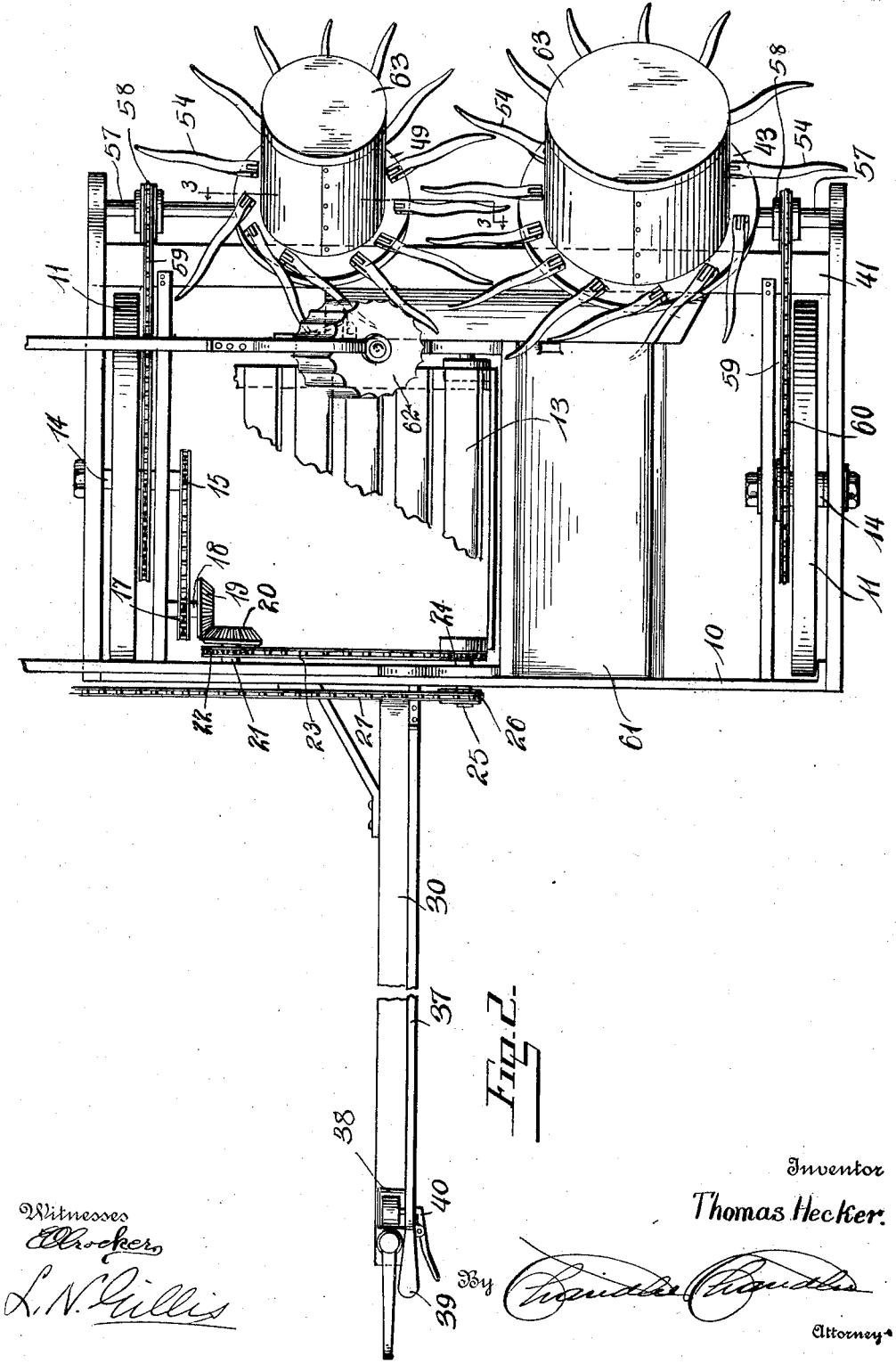
Figure 3:
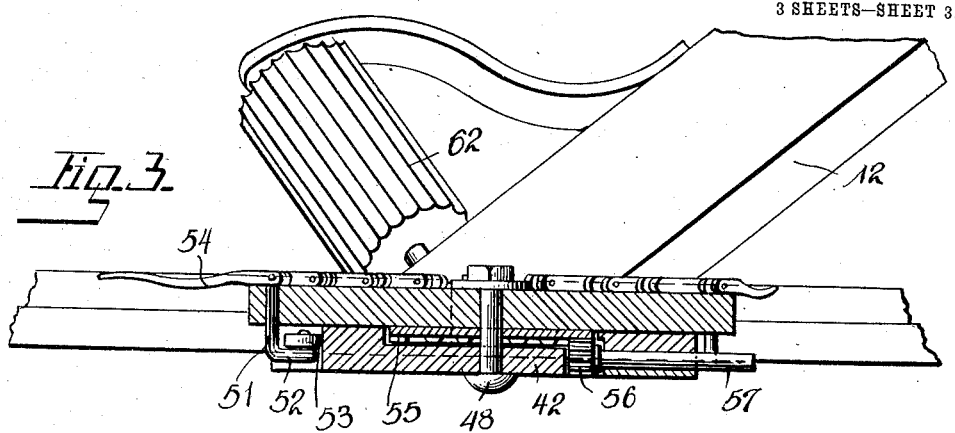
Figure 4:
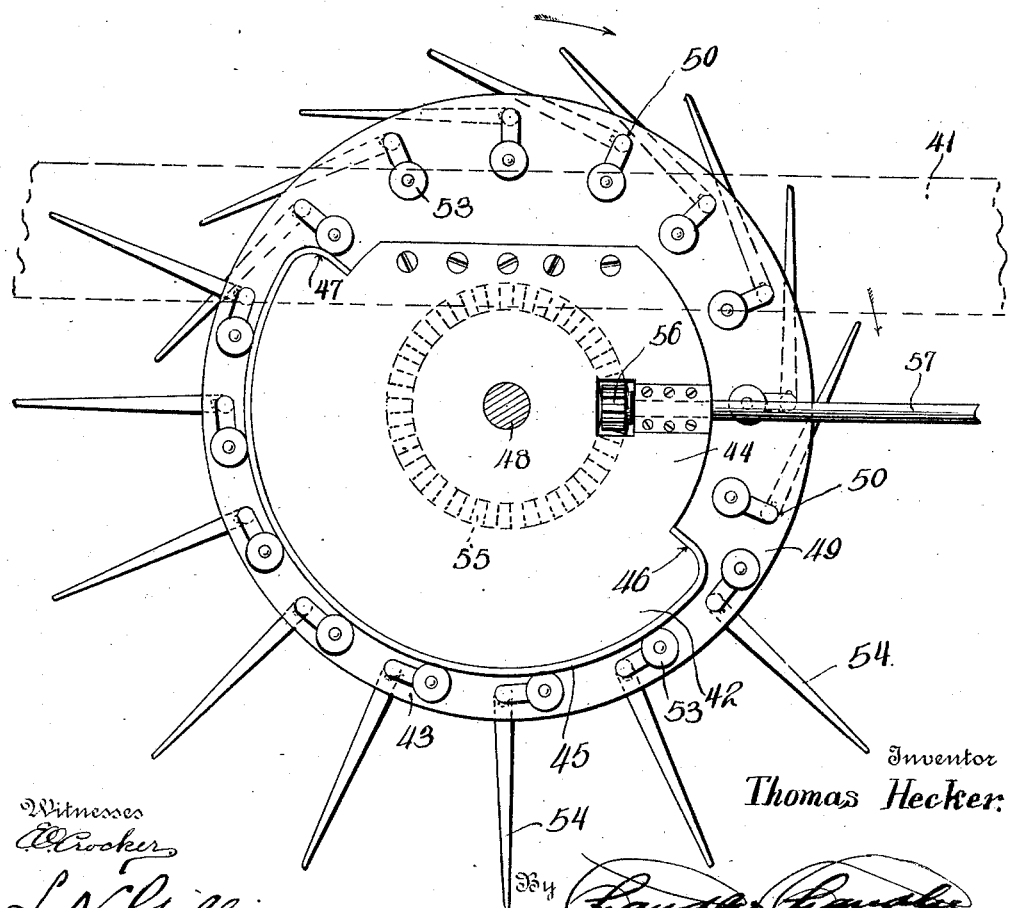

In the accompanying drawings, like characters of reference indicate like parts in the several views, and Figure 1 is a side elevation of a shock loader constructed in accordance with this invention. Fig. 2 is a top plan view of such a loader. Fig. 3 is a section on the line 3—3 of Fig. 2. Fig. 4 is a bottom plan view of one of the cams showing the disk used therewith. Fig. 5 is a detail view of the gearing.

The loader in which this invention is embodied comprises a frame 10 supported on ground wheels 11, and on this frame is a conveyer frame 12 arranged to carry a conveyer 13. The ground wheels 11 are fixed upon suitable axles 14 and on one of these axles 14 is a sprocket 15 which is connected by a chain 16 with a sprocket 17 carried on a shaft 18. This shaft 18 is supported in suitable bearings in the frame and on this shaft is a bevel gear 19 which meshes with a bevel gear 20 carried on a shaft 21 also supported in the frame 10. On this shaft 21 is a sprocket 22 over which runs a sprocket chain 23, this chain serving to drive a sprocket 24 fixed upon a shaft 25 carried in suitable bearings on the frame 10. On the shaft 25 is also fixed a sprocket 26 over which runs a chain 27. This chain 27 serves to actuate a sprocket 28 at the upper end or head of the conveyer and this sprocket 28 is mounted on a shaft 29 carried in the conveyer frame 12, this shaft serving in the usual manner to actuate the conveyer 13.

By means of the mechanism just described or some similar mechanism of this character the conveyer 13 is driven as the machine is moved across the field.

Attached to the rear of the frame 10 is a pole or tongue 30 to which the draft animals may be attached and the rear end of this pole or tongue is supported by a suitable ground wheel 31 carried in a steering fork 32 provided with the usual steering handle 33. Extending upward from the rear end of the pole 30 is a bar 34 having a series of openings 35 made therein. This tongue 30 is attached to the frame by means of a pivot 36 and adjacent the tongue 30 and fixedly secured to the frame 10 is a lever 37 having a loop 38 formed thereon which engages over the bar 34. On the end of the lever 37 is a handle 39 and adjacent this handle is a spring pressed latch 40 arranged to engage in one or the other of the openings 35 according to the position of the lever 37. By means of the adjustment of this lever 37 on the bar 34 the front of the frame may be raised or lowered with reference to the ground.

Across the front of the frame and forming part thereof is a member 41 and secured to this member 41 and extending downwardly and forwardly are cam members 42. Each of these cam members has an arcuate portion 43 forming what may be termed the operative portion of its periphery, and this portion has the greatest radius of any part of the cam. The remainder of the cam periphery is indicated at 44 and as can be clearly seen by reference to Fig. 4 this part has a smaller radius than the arcuate portion 43. This portion 44 of the periphery of the cam is preferably termed the inactive or inoperative part of the cam. Around the periphery of the arcuate portion 43 is fixed a wearing strip 45 of steel or other suitable metal and this wearing strip also extends over the shoulders 46 and 47 formed respectively at the end and the beginning of the operative portion of the cam periphery.

Extending through the cams 42 are shafts 48 whereon are mounted disks 49, each disk having a series of openings 50 adjacent its periphery. Through the openings 50 extend shafts 51 each of which is bent at its lower end at a right angle to form a portion 52 whereon is mounted a roller 53 adapted to bear against the wear plate 43 as the disk is rotated. The cams 42 are fixed in position on the frame member 41 and the disks are fixed to the respective shafts 48. On the upper end of each of the short shafts 51 is pivoted a finger 54, the pivot extending transversely of the shaft 51 and in such position that the finger 54 extends at right angles to the direction of the bent end 52 of the respective shaft. On each of the shafts 48 is fixed a bevel gear 55 wherewith meshes a bevel pinion 56 carried on a shaft 57. These shafts 57 extend in opposite directions to the outer sides of the frame and adjacent their outer ends said shafts are provided with sprockets 58 which are connected by means of chains 59 with sprockets 60 fixed upon the shafts 14. By means of this arrangement, as the machine is pushed forward by the draft animals the rotation of the ground wheels 11 will cause the respective disks to rotate in the direction of the arrows on Figs. 2 and 4. Now, as these disks rotate in this manner the rollers 53 successively contact with the shoulder 47 of the cam and the fingers are thrown out and held in the position indicated at the lower and left hand sides of Fig. 4.

On one side of the frame 10 is a slanting guide or stop board 61 while upon the other side of the frame is a corrugated stop roller 62. Now, as the fingers 54 reach the end 46 of their respective cams these fingers will contact respectively with the stop board and stop roller with the result that the fingers will be moved to the position indicated at the upper and right hand side of Fig. 4, the guide-way portion of the respective cam permitting said movement.

In order to hold the shocks in the upright position each of the disks 49 has mounted thereon a drum 63, the drum being in axial alinement with the disk and rotating therewith.

In the operation of the device the lever 37 is properly adjusted to suit the height of the shocks and the inequalities of the ground and the device driven over the field in such manner that the space between the disks 49 will be in alinement with the shock desired to be picked up. As the machine passes across the field the disks 49 are constantly rotating and the fingers being swung out and in by the action of the cams and the stop board and stop roller. It is to be observed that the fingers project outward as the disks revolve to bring them in front of the machine and these outwardly projecting fingers grasp the shock at the bottom and the continuance of the rotation carries the shock up between the drums 63 and deposits it in the valley formed between the board 61 and the conveyer 13, the lower edge of this board slanting down to meet and lie adjacent the conveyer. As soon as the shock is in such position that it will fall either on the board 61 or the conveyer 13 the action of the cams in holding the fingers outward ceases and the fingers fold in by striking against either the board 61 or roller 62 as previously described. Meanwhile the motion of the conveyer continues and the shock is picked up by the conveyer, carried to the top thereof and deposited in a wagon or rack driven along beneath the end of said conveyer. By means of the steering wheel 31 the machine may be brought up to the shocks in proper position and the entire device renders it unnecessary to handle the shocks from the time they have been set up in the field until the time they are loaded into the wagon or rack.

It is to be noted that it is preferable to make one of the disks 49 of less diameter than the other as can be clearly seen by reference to Fig. 2, the smaller disk lying adjacent the stock roller 62.

There has thus been provided a simple and efficient device of the kind described and for the purpose specified.

It is obvious that minor changes may be made in the form and construction of this invention without departing from the material principles thereof. It is not therefore desired to confine the invention to the exact form herein shown and described, but it is wished to include all such as properly come within the scope of the appended claims.

Having thus described the invention, what is claimed as new, is:—

1. In a device of the kind described, a frame, wheels supporting said frame, spaced cams fixed upon said frame, disks mounted on said cams to rotate thereon, drums concentric with said disks and fixed upon and extending upward from the respective disks, swinging fingers carried by said disks, and means connected to said fingers to engage said cams and swing and hold said fingers outward from the disks during a portion of the revolutions of said disks, stops on said frame in the paths of said fingers, said stops being positioned to be engaged by said fingers to swing the same inward during the remainder of the revolutions of said disks, and an operating mechanism for said disks connected to and actuated by the rotation of said wheels.

2. In a device of the kind described, a frame, wheels supporting said frame, spaced cams fixed upon said frame, disks mounted on said cams to rotate thereon, a series of shafts journaled in said disks adjacent the peripheries of the disks, arms formed on said shafts, rollers on said arms adapted to contact with portions of the respective cams, fingers carried by said shafts and lying substantially at right angles to the arms, elements arranged to swing said fingers inward, said elements being positioned on the frame to engage the fingers after the rollers have left the portions of the cams wherewith they engage, drums fixed upon the upper ends of said disks concentric therewith and an operating mechanism for said disks connected to and actuated by the rotation of said wheels.

3. In a device of the kind described, a frame, wheels supporting said frame, spaced cams fixed upon said frame, disks mounted on said cams to rotate thereon, swinging fingers carried by said disks, and means connected to said fingers to engage said cams and swing and hold said fingers outward from the disks during a portion of the revolutions of said disks, a drum arranged to swing the fingers of one disk inward during the remainder of the revolution of the disk, and an operating mechanism for said disks connected to and actuated by the rotation of said wheels; in combination with a conveyer extending upwardly and laterally from said frame and having its lower end lying immediately behind the space between the disks, a guide board extending upward said guide board also forming means to swing the fingers of the remaining disk inward after release from the respective cam and away from said conveyer to form a trough behind the space between said disks, and means to actuate said conveyer.

4. In a device of the kind described, a frame, wheels supporting said frame, spaced cams fixed upon said frame, disks mounted on said cams to rotate thereon, drums concentric with said disks and fixed upon the respective disks, swinging fingers carried by said disks, and means connected to said fingers to engage said cams and swing and hold said fingers outward from the disks during a portion of the revolutions of said disks, a stop on said frame in the paths of the fingers of one disk, said stops being positioned to swing said fingers inward during the remainder of the revolutions of said disk, and an operating mechanism for said disks connected to and actuated by the rotation of said wheels; in combination with a conveyer extending upwardly and laterally from said frame and having its lower end lying immediately behind the space between the disks, a guide board extending upward and away from said conveyer to form a trough behind the space between said disks, said guide board also forming means to swing the fingers of the remaining disk inward after release from the respective cam and means to actuate said conveyer.

5. In a device of the kind described, a frame, wheels supporting said frame, spaced cams fixed upon said frame, disks mounted on said cams to rotate thereon, a series of shafts journaled in said disks adjacent the peripheries of the disks, arms formed on said shafts, rollers on said arms adapted to contact with portions of the respective cams, fingers carried by said shafts and lying substantially at right angles to the arms, a stop arranged to swing the fingers of one disk inward, said element being positioned on the frame to engage the fingers after the rollers have left the portions of the cams wherewith they engage, and an operating mechanism for said disks connected to and actuated by the rotation of said wheels; in combination with a conveyer extending upwardly and laterally from said frame and having its lower end lying immediately behind the space between the disks, a guide board extending upward and away from said conveyer to form a trough behind the space between said disks, said guide board also forming means to swing the fingers of the remaining disk inward after release from the respective cam and means to actuate said conveyer.

6. In a device of the kind described, a frame, wheels supporting said frame, spaced cams fixed upon said frame, disks mounted on said cams to rotate thereon, swinging fingers carried by said disks, and means connected to said fingers to engage said cams and swing and hold said fingers outward from the disks during a portion of the revolutions of said disks, a stop arranged to swing the fingers of one disk inward during the remainder of the revolutions of the disks, and an operating mechanism for said disks connected to and actuated by the rotation of said wheels; in combination with a conveyer extending upwardly and laterally from said frame and having its lower end lying immediately behind the space between the disks, a guide board extending upward and away from said conveyer to form a trough behind the space between said disks, means to actuate said conveyer, said guide board also forming means to swing the fingers of the remaining disk inward after release from the respective cam and elements arranged to adjust the height of said disks with reference to the ground.

7. In a device of the kind described, a frame, wheels supporting said frame, spaced cams fixed upon said frame, disks mounted on said cams to rotate thereon, drums concentric with said disks and fixed upon the respective disks, swinging fingers carried by said disks, and means connected to said fingers to engage said cams and swing and hold said fingers outward from the disks during a portion of the revolutions of said disks, stops on said frame in the paths of said fingers, said stops being positioned to swing said fingers inward during the remainder of the revolutions of said disks, and an operating mechanism for said disks connected to and actuated by the rotation of said wheels; in combination with a conveyer extending upwardly and laterally from said frame and having its lower end lying immediately behind the space between the disks, means to actuate said conveyer, and elements arranged to adjust the height of said disks with reference to the ground.

8. In a device of the kind described, a frame, wheels supporting said frame, spaced cams fixed upon said frame, disks mounted on said cams to rotate thereon, a series of shafts journaled in said disks adjacent the peripheries of the disks, arms formed on said shafts, rollers on said arms adapted to contact with portions of the respective cams, fingers pivoted to said shafts and normally lying substantially at right angles to the arms, elements arranged to swing said fingers inward, said elements being positioned on the frame to engage the fingers after the rollers have left the portions of the cams wherewith they engage, and an operating mechanism for said disks connected to and actuated by the rotation of said wheels; in combination with a conveyer extending upwardly and laterally from said frame and having its lower end lying immediately behind the space between the disks, means to actuate said conveyer, and elements arranged to adjust the height of said disks with reference to the ground.

In testimony whereof, I affix my signature, in presence of two witnesses.

THOMAS HECKER.

Witnesses:
M. T. MILLER,
GEO. H. CHANDLER.

---

Copies of this patent may be obtained for five cents each, by addressing the "Commissioner of Patents, Washington, D. C."